Patented Nov. 14, 1944

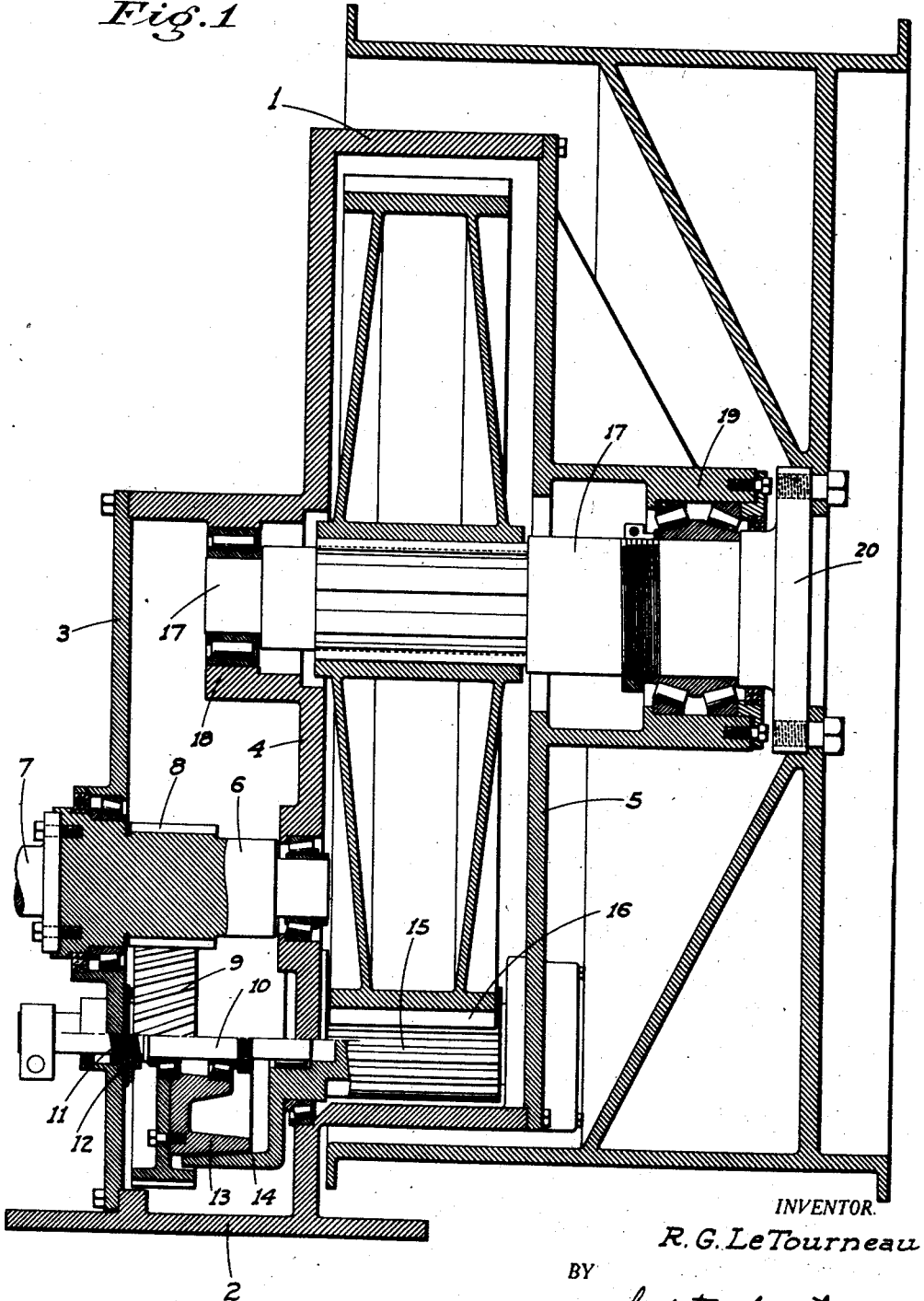

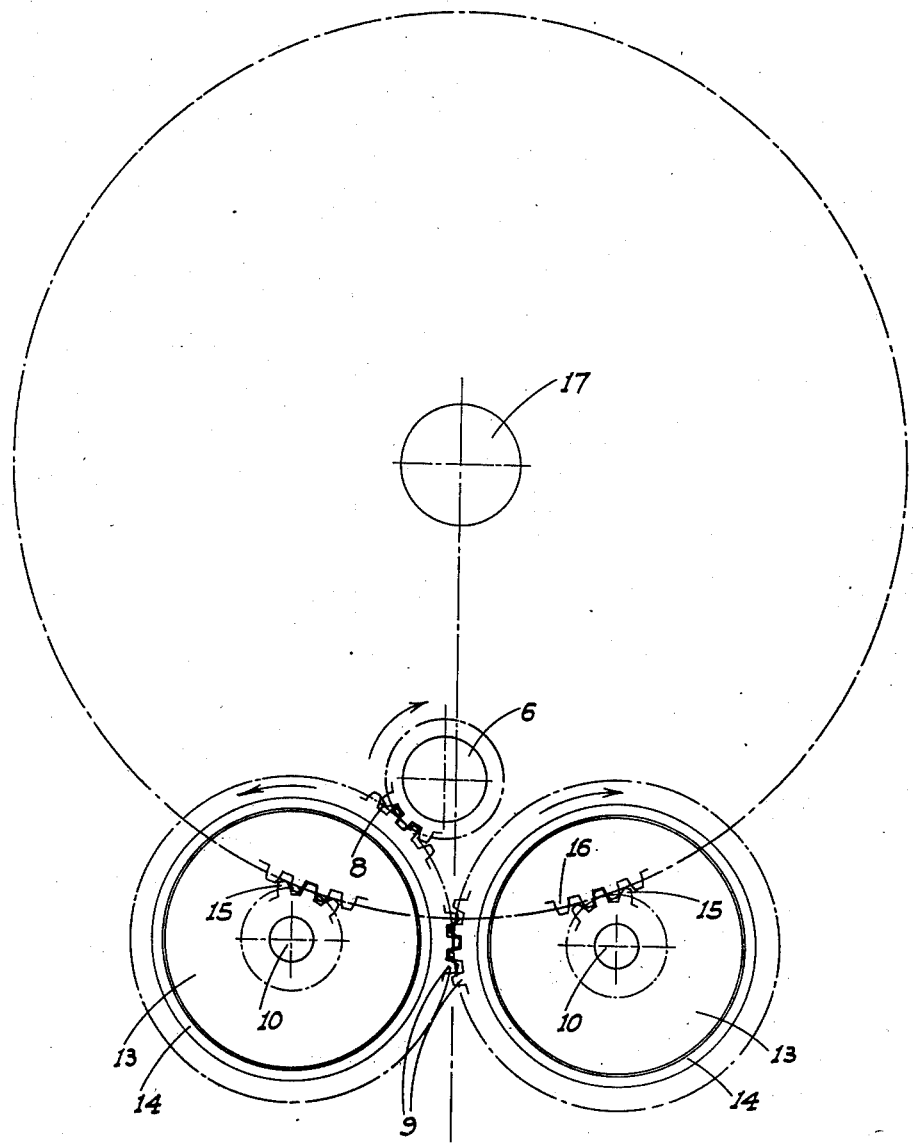

2,362,568

UNITED STATES PATENT OFFICE 2,362,568

REVERSIBLE POWER CONTROL UNIT

Robert G. Le Tourneau, Peoria, Ill., assignor to R. G. Le Tourneau, Inc., Stockton, Calif., a corporation Application July 10, 1942, Serial No. 450,390

2 Claims. (Cl. 254—187)

This invention relates to a cable drum control mechanism or power control unit, my principal object being to provide, as a heavy-duty and compact unit, a cable drum, an initial power shaft constantly turning in one direction, and operator controlled means incorporated in the unit connecting said shaft and the drum for rotation of the latter in reverse directions selectively and as may be desired.

This and other objects I accomplish by means of such structure and relative arrangement of parts as will fully appear by a perusal of the following specification and claims.

In the drawings similar characters of reference indicate corresponding parts in the several views:

Figure 1 is a sectional elevation of the improved unit.

Figure 2 is a diagrammatic transverse view showing the gearing sections between the cable drum and the drive shaft.

Referring now more particularly to the characters of reference on the drawings, the unit comprises a housing 1 having a supporting base 2 and provided with a front wall 3, intermediate wall 4 and a back wall 5.

Journaled in the front and intermediate walls 3 and 4 is a stub shaft 6 connected at its outer end to a drive shaft 7. A pinion 8 is formed on the shaft 6 within the housing, between the walls 3 and 4, which meshes with one only of a pair of meshing gears 9 disposed below the shaft 6 in transversely spaced relation. Each gear is journaled against relative axial movement on an individual control shaft 10 extending between the walls 3 and 4 and having a threaded portion 11 engaging a tapped collar 12 secured on the wall 3.

A male cone clutch element 13 is secured with the gear and cooperates with a female clutch element 14 journaled in the wall 4; the adjacent end of the shaft 10 being journaled in the hub of the element 14. The pinion and gears are of helical form cut so as to aid the clutch engaging movement had by the rotation of the shaft 10 in the proper direction, as in my co-pending application for patent, Serial No. 407,213, filed August 16, 1942, now Patent No. 2,322,371, dated June 22, 1943.

Between the housing walls 4 and 5 each clutch element 14 is formed or rigid with a pinion 15 meshing with an upstanding gear 16. Since both pinions 15 mesh with the gear 16, and since the intermeshing gears 9 connected to the corresponding clutch elements 13 rotate in opposite directions, it will be seen that if the clutches of the two gears 9 are alternately engaged, the gear 16 will turn in one direction or the other.

The gear 16 is secured on a shaft 17 journaled in a boss 18 on the wall 4 above the shaft 6 and in a boss 19 formed as a rearward extension of the rear housing wall 5. The shaft 17 at its rear end beyond the boss 19 is provided with an enlarged flange 20 secured on the web of a cable drum 21. This drum overhangs the boss 19 and the rear and cylindrical portion of the housing to adjacent the wall 4, the base 2 extending below the lowest portion of the drum and depending from the forward portion of the housing. The base may therefore be mounted directly on any flat surface, and even if it projects beyond the base below the drum, the latter will clear such surface. By making the drum so that it overhangs the housing as far as possible, a drum of considerable width may be obtained in a very compact surface, and pressures on the drum are substantially centralized in the housing.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A power control unit comprising a housing which includes a front portion and a rear cylindrical portion extending above the front portion but terminating at the bottom above the base of the front portion, a shaft journaled in the housing axially of the rear portion, a bull gear on the shaft in said rear housing portion, means in the front portion of the housing to control the rotation of the gear and having a pinion meshing therewith and a cable drum secured on the rear end of the shaft rearwardly of the housing and overhanging said rear portion thereof; the drum at the bottom being above the base of the front portion of the housing whereby said base may rest on a supporting surface without interference from the drum.

2. A power control unit comprising a housing having a rear portion and a central boss projecting rearwardly therefrom, a shaft journaled in the housing ahead of said rear portion and in the boss, the shaft having a rear end flange disposed rearwardly of the boss, a gear on the shaft within said rear housing portion, control means for said gear mounted in the housing, a hubless cable drum fixed on the flange and overhanging the boss, said rear housing portion being cylindrical and said drum also overhanging said portion.

ROBERT G. LE TOURNEAU.